United States Patent
Schiff et al.

(10) Patent No.: US 10,320,605 B2
(45) Date of Patent: Jun. 11, 2019

(54) RAPID GATEWAY SWAP

(71) Applicant: Nimbus 9, Inc., Colorado Springs, CO (US)

(72) Inventors: Lucas Schiff, Monument, CO (US); Andrew Hutchinson, Colorado Springs, CO (US)

(73) Assignee: Nimbus 9, Inc., Colorado Springs, CO (US)

( * ) Notice: Subject to any disclaimer, the term of this patent is extended or adjusted under 35 U.S.C. 154(b) by 426 days.

(21) Appl. No.: 14/882,072

(22) Filed: Oct. 13, 2015

(65) Prior Publication Data

US 2016/0112249 A1    Apr. 21, 2016

Related U.S. Application Data

(60) Provisional application No. 62/064,230, filed on Oct. 15, 2014.

(51) Int. Cl.
*H04L 12/24*    (2006.01)

(52) U.S. Cl.
CPC ...... *H04L 41/0668* (2013.01); *H04L 41/0672* (2013.01); *H04L 41/0806* (2013.01); *H04L 41/0816* (2013.01); *H04L 41/0856* (2013.01); *H04L 41/0889* (2013.01)

(58) Field of Classification Search
CPC .................................................. H04L 41/0668
USPC ......................................................... 709/221
See application file for complete search history.

(56) References Cited

U.S. PATENT DOCUMENTS

| | | | | |
|---|---|---|---|---|
| 5,875,306 A | * | 2/1999 | Bereiter | G06F 9/4416 709/220 |
| 6,073,172 A | * | 6/2000 | Frailong | H04L 41/0806 709/222 |
| 6,298,062 B1 | * | 10/2001 | Gardell | H04M 3/4281 370/230 |
| 6,437,692 B1 | * | 8/2002 | Petite | G01D 4/004 340/540 |
| 8,639,989 B1 | * | 1/2014 | Sorenson, III | G06F 11/2071 709/224 |
| 8,750,123 B1 | * | 6/2014 | Alisawi | H04W 28/0284 370/231 |
| 9,270,523 B2 | * | 2/2016 | Lingafelt | H04L 12/28 |
| 9,455,955 B2 | * | 9/2016 | Fetik | G06F 21/552 |
| 9,647,906 B2 | * | 5/2017 | Asenjo | H04L 43/04 |
| 9,686,808 B2 | * | 6/2017 | Ghai | H04W 76/02 |

(Continued)

OTHER PUBLICATIONS

TechTarget, "cloud storage gateway", 2018.*

(Continued)

*Primary Examiner* — Ondrej C Vostal
(74) *Attorney, Agent, or Firm* — Lewis Brisbois Bisgaard & Smith LLP; Thomas A. Dougherty

(57) ABSTRACT

Systems, software, and methods are provided to rapidly configured replacement gateways and other devices when needed. Configuration information may be received and stored in memory. The information may be sent to a first device or gateway. If the first device or gateway needs to be reconfigured, the information may be resent to the first device or gateway. If the first device or gateway fails, the information may be send to a second device or gateway to configure the second device for use in the system, thereby rapidly swapping the first device and second device.

16 Claims, 7 Drawing Sheets

(56) References Cited

U.S. PATENT DOCUMENTS

| | | | | |
|---|---|---|---|---|
| 9,736,088 B1* | 8/2017 | Bueker | | H04L 51/02 |
| 2002/0156869 A1* | 10/2002 | Wong | | H04L 29/06 |
| | | | | 709/219 |
| 2002/0194381 A1* | 12/2002 | Furubayashi | | H04L 69/08 |
| | | | | 709/246 |
| 2003/0200285 A1* | 10/2003 | Hansen | | H04L 41/0806 |
| | | | | 709/220 |
| 2005/0232210 A1* | 10/2005 | Karaoguz | | G06F 17/30038 |
| | | | | 370/338 |
| 2006/0168225 A1* | 7/2006 | Gunning | | G06Q 30/06 |
| | | | | 709/226 |
| 2009/0019314 A1* | 1/2009 | Younger | | H04L 41/00 |
| | | | | 714/37 |
| 2009/0055514 A1* | 2/2009 | Tebbs | | H04L 12/2807 |
| | | | | 709/220 |
| 2009/0210929 A1* | 8/2009 | Zill | | H04L 63/0227 |
| | | | | 726/4 |
| 2010/0202450 A1* | 8/2010 | Ansari | | G06Q 30/04 |
| | | | | 370/389 |
| 2010/0254260 A1* | 10/2010 | Robinson | | H04L 41/0896 |
| | | | | 370/230 |
| 2010/0306061 A1* | 12/2010 | Wagner | | G06Q 30/02 |
| | | | | 705/14.66 |
| 2011/0126047 A1* | 5/2011 | Anderson | | H04L 9/3213 |
| | | | | 714/15 |
| 2011/0131645 A1* | 6/2011 | Johnson | | G06F 11/0709 |
| | | | | 726/12 |
| 2012/0002639 A1* | 1/2012 | Lu | | H04B 7/18506 |
| | | | | 370/331 |
| 2012/0221955 A1* | 8/2012 | Raleigh | | H04M 15/00 |
| | | | | 715/736 |
| 2012/0239822 A1* | 9/2012 | Poulson | | H04L 41/0668 |
| | | | | 709/239 |
| 2012/0253990 A1* | 10/2012 | Skala | | G06Q 30/06 |
| | | | | 705/27.1 |
| 2013/0003719 A1* | 1/2013 | Kamdar | | H04W 4/22 |
| | | | | 370/352 |
| 2013/0018945 A1* | 1/2013 | Vendrow | | H04L 65/1006 |
| | | | | 709/203 |
| 2013/0080619 A1* | 3/2013 | Assuncao | | G06F 9/45558 |
| | | | | 709/224 |
| 2013/0179320 A1* | 7/2013 | May | | G06Q 40/04 |
| | | | | 705/37 |
| 2013/0198346 A1* | 8/2013 | Jubran | | H04L 41/12 |
| | | | | 709/220 |
| 2014/0025695 A1* | 1/2014 | Bickle | | G06F 17/30194 |
| | | | | 707/756 |
| 2014/0143390 A1* | 5/2014 | Umapathy | | H04L 41/0813 |
| | | | | 709/221 |
| 2014/0157042 A1* | 6/2014 | Johnson | | G06F 11/2002 |
| | | | | 714/4.11 |
| 2014/0173675 A1* | 6/2014 | Ahmed | | H04N 5/23206 |
| | | | | 725/116 |
| 2014/0184508 A1* | 7/2014 | Tamasi | | G06F 1/1632 |
| | | | | 345/161 |
| 2014/0282817 A1* | 9/2014 | Singer | | H04L 63/08 |
| | | | | 726/1 |
| 2014/0359091 A1* | 12/2014 | Senniappan | | H04L 41/12 |
| | | | | 709/221 |
| 2015/0049714 A1* | 2/2015 | Ghai | | H04W 76/02 |
| | | | | 370/329 |
| 2015/0095477 A1* | 4/2015 | Jung | | H04M 1/72519 |
| | | | | 709/223 |
| 2015/0106489 A1* | 4/2015 | Duggirala | | H04L 61/2503 |
| | | | | 709/222 |
| 2015/0139037 A1* | 5/2015 | Li | | H04L 41/0886 |
| | | | | 370/255 |
| 2015/0163096 A1* | 6/2015 | Lee | | G06Q 50/10 |
| | | | | 709/221 |
| 2016/0021578 A1* | 1/2016 | Bostick | | H04W 48/17 |
| | | | | 370/332 |
| 2016/0028821 A1* | 1/2016 | Petisce | | A61B 5/0022 |
| | | | | 709/219 |
| 2016/0055469 A1* | 2/2016 | Kim | | H04L 41/12 |
| | | | | 705/21 |
| 2016/0098309 A1* | 4/2016 | Kim | | G06F 11/0709 |
| | | | | 714/47.1 |
| 2016/0119206 A1* | 4/2016 | Ansamaa | | H04L 43/08 |
| | | | | 370/252 |
| 2016/0197843 A1* | 7/2016 | Palan | | G06F 9/5072 |
| | | | | 709/226 |

OTHER PUBLICATIONS

Wikipedia, "cloud gateway", 2018.*
Wikipedia, "Cloud storage gateway", 2018.*
Wikipedia, "Gateway (telecommunications)", 2018.*
Wikipedia, "IEEE 802.15" 2018 (Year: 2018).*
DARPA, "Internet Protocol", RFC 791, 1981 (Year: 1981).*

* cited by examiner

RAPID GATEWAY SWAP

CROSS REFERENCE TO RELATED APPLICATIONS

This application claims priority to, and benefit from, provisional patent application Ser. No. 62/064,230, entitled "Rapid Gateway Swap", filed Oct. 15, 2014, which is incorporated herein by reference for all purposes.

BACKGROUND

Many systems allow for some control of devices using remote devices, the Internet, and the cloud. These systems are cumbersome and the user may need to know and use device specific information to control and configure the devices. The devices may include routers, modems, gateways, etc.

Overview

Systems, software, and methods are provided to rapidly configured replacement gateways or other devices, when needed. Configuration information may be received and stored in memory. The information may be sent to a first device. If the first device needs to be reconfigured, the information may be resent to the first device. If the first device fails, the information may be send to a second device to configure the second device for use in the system.

DESCRIPTION

What has yet to be seen in the controls industry is a complete end to end solution that is centered on the cloud being the central intelligence. With existing industry solutions, the gateway typically acts as the computing resource, translating between internal network protocols and the Internet or other network, housing the access list of items that it is allowed to communicate with, making decisions, etc. However, difficulties may arise when a device fails or is compromised, either by environmental circumstances or plain electronic or mechanical failure. All data may be lost and the end user may have to spend countless hours trying to reconfigure everything to its last known state. By transferring the computing process to the cloud, a gateway can be treated as a mere communication bridge between the internal networks and the Internet, and keeps the settings, data, computing, access lists, decision making, etc. in a centralized location.

The purpose of this invention is to make disaster recovery of a gateway a much less time consuming and costly process. With cloud based intelligence, all the meaningful data may be kept in a highly redundant, high uptime, scalable environment. This makes the recovery procedure as simple as changing the unique device identifier (UDID) of the failed gateway to the new gateway UDID from a web browser connected to the cloud platform to regain full function from the control system, as all settings are stored in a centralized location in the cloud.

In principle, this cloud based service allows a user to quickly and efficiently replace hardware components (gateways or other devices or components) which are not functioning properly without the time and cost of reconfiguring various devices in the system. A virtualized configuration for each gateway or other device may be stored centrally in the cloud infrastructure and is the means to which a gateway interacts with both the cloud and other associated devices.

Figure 1:
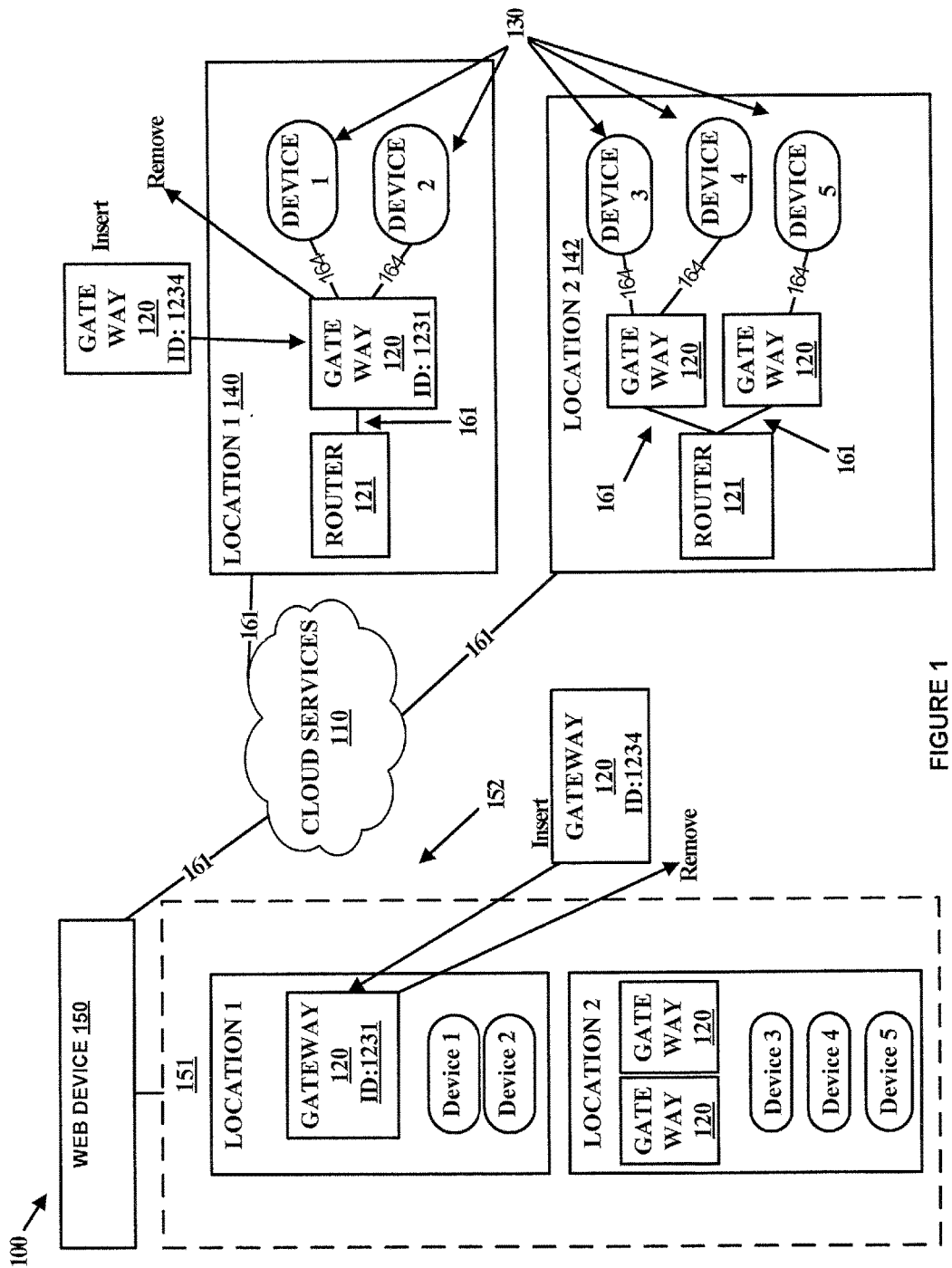
FIG. 1 is a system diagram illustrating gateway swap system, according to an example.

FIG. 1 is a system diagram illustrating an example gateway hot swap system 100. System 100 includes cloud services/infrastructure 110, gateways 120, Internet 121, devices 130, location 140, web device 150 and displayed information 151.

Web device 150 communicates over link 161 to cloud services 110. Internet router 121 communicates over link 161 to cloud services 110. Gateways 120 communicate over link 161 to Internet Router 130. Devices 130 communicate over link 164 to gateways 120. Displayed information 151 indicates a change in gateway UDID while keeping the same device data intact. Location 1 indicates a physical change in gateways while retaining the same physical device connections.

Cloud services 110 is shown as a generic cloud, with multiple underlying services and technologies which comprise a singular service to an end user. Cloud services or infrastructure 110 refers to anything which is part of a service that is hosted remotely and accessible from anywhere via the Internet or other communication network or protocol. Cloud services act as a central resource for communicating with devices 130 and web devices 150.

Cloud services 110 provide centralized messaging, computing, data storage, analytics, user management, device 130 management, gateway 120 management, account management, location 140 management, control messaging, asynchronous state messaging and displayed information 151. Cloud services 110 acts as a resource that sends and receives data from multiple gateways and multiple devices and allows for the replacement of gateway 120 UDID to facilitate the physical change in gateway hardware while retaining all device information associated with the previous gateway or other device.

Gateway 120 is a communication bridge that connects device 130 to cloud services 110 via link 164 to Internet router 121. Gateway 120 consists of a messaging translator that can receive communication via any device messaging protocol (i.e. Zigbee, Z-wave, Jennet-ip, Enocean, Wi-Fi, powerline communication, Bacnet, Lonworks, Modbus, etc. . . . ) and translate to a common cloud messaging protocol. Gateway 120 provides a path from any device messaging protocol to cloud services 110.

Internet router 121 is any standard Internet router that takes network traffic (i.e. TCP/IP or UDP) from a private network and provides access to the public Internet. Internet router 121 connects gateway 120 to cloud services 110 by bridging link 161 to link 161.

Device 130 is any electronic device which has a way to communication via any communication medium (i.e. wireless radio, power-line communication, etc. . . . ) and device messaging protocol. Examples of device 130 may include, but not limited to: light bulbs, lighting drivers, wireless adapters, photo sensors, motion sensors, water/moisture sensors, position sensors, magnetic sensors, switches, temperature sensors, fluid level sensors, thermostats, network sensors, power outlets, circuit breakers, utility meters, display devices, appliances (washer, dryer, refrigerator, dishwasher, audio/visual equipment, toaster, microwave, oven, stove, coffee maker, etc. . . . ), cameras, computers, mobile devices, GPS, locking devices, proximity sensors, security card/badge readers, intrusion sensors, battery sensor, etc. . . . . Device 130 communicates to cloud services 110 via link 164 through gateway 120. Device 130 may be sent messages from cloud services 110 to control it and also may send messages to cloud services 110 for the purpose of communicating state, status, etc. . . . .

Location 1 140 is any physical site that one or more gateway 120 and device 130 components physically reside. Examples include, but are not limited to: commercial buildings, residential homes, industrial buildings, hospitals, hotels, motels, multiple dwelling units, agricultural facilities, etc.

Web device 150 may include any web-connected device that can send and receive messages and display information. Web device 150 communicates to cloud services 110 via link 161. Examples may include: smartphones, tablet computers, laptop computers, desktop computers, server computers, etc. Web device 150 consists of a user interface 152 to visualize displayed information 151 and provide control of displayed information 151 via touch or human interface device (i.e. track pad or mouse).

User interface 152 may also receive user inputs from a user to be sent to cloud serves 110. The user inputs could include grouping information, login information, etc.

Displayed information 151 is received from cloud services 110 through web device 150. No displayed information 151 is stored on web device 150. It is just visualized information received from cloud services 110. In this way, displayed information 151 is decoupled from any web device 150 and allows user to see any information provided by cloud services 110 without the need to be physically connected. Displayed information 151 can consist of device 130 status, state, location, groups, etc. . . . . Displayed information 151 can also consist of gateway 120 statuses, UDID, location, associated devices 130, etc. . . . . Displayed information 151 connects to cloud services 110, which provides a list of devices based on location 140 and has no dependencies on which gateway 120 the device 130 is connected to cloud services 110 through.

Link 161 uses various communication media, such as air, space, metal, optical fiber, or some other signal propagation path, including combinations thereof. Link 161 could use various communication protocols, such as Internet Protocol (IP), Ethernet, Wireless Fidelity (Wi-Fi), Time Division Multiplexing (TDM), Asynchronous Transfer Mode (ATM), Code Division Multiple Access (CDMA), Evolution-Data Optimized (EV-DO), single-carrier radio transmission technology, Frame relay, optical, synchronous optical networking (SONET), or some other communication format, including combinations, improvements, or variations thereof. Link 161 could be a direct link or may include intermediate networks, systems, or devices.

Link 164 is the communication that stems from device 130 and may connect to gateway 120 or directly to cloud services 110. Link 164 uses various communication media, such as air, space, metal, optical fiber or some other signal propagation path, including combinations thereof. Link 164 could use various communications protocols, such as Internet Protocol (IP), Ethernet, Wireless Fidelity (Wi-Fi), Bluetooth, Zigbee, Z-Wave, Enocean, Jennet-IP, NFC, X-bee, 802.15.4, 6LowPAN, TCP/IP, Insteon, ANT, DASH7, NeuRFon, Senceive, WPAN, WirelessHART, Contiki, TinyOS, LONworks, Modbus, BacNet, or some other communication format, including combinations, improvements, or variations thereof. Link 164 could be a direct link or may include intermediate networks, systems, or devices.

In this example, a user may receive an indication that gateway 1231 is not operating properly. All information may have been previously received and stored in the cloud 110 from a user or from gateway 1231, or from another source. The user may then indicate to resend the saved information to gateway 1231 in an attempt to get gateway 1231 working properly again.

If gateway 1231 s not operating properly, the user may indicate, via interface 151 to remove gateway 1231 and insert gateway 1234, thereby "swapping" the gateways. Once the gateways are swapped at location 1 140, the previously stored configuration data for Gateway 1231 may be loaded onto gateway 1234. This would save time, money, and configuration error, and have the entire system 100 up and running properly. It will be appreciated that gateway 1234 may be a previously connected redundant device, which may be swapped in.

Figure 2:
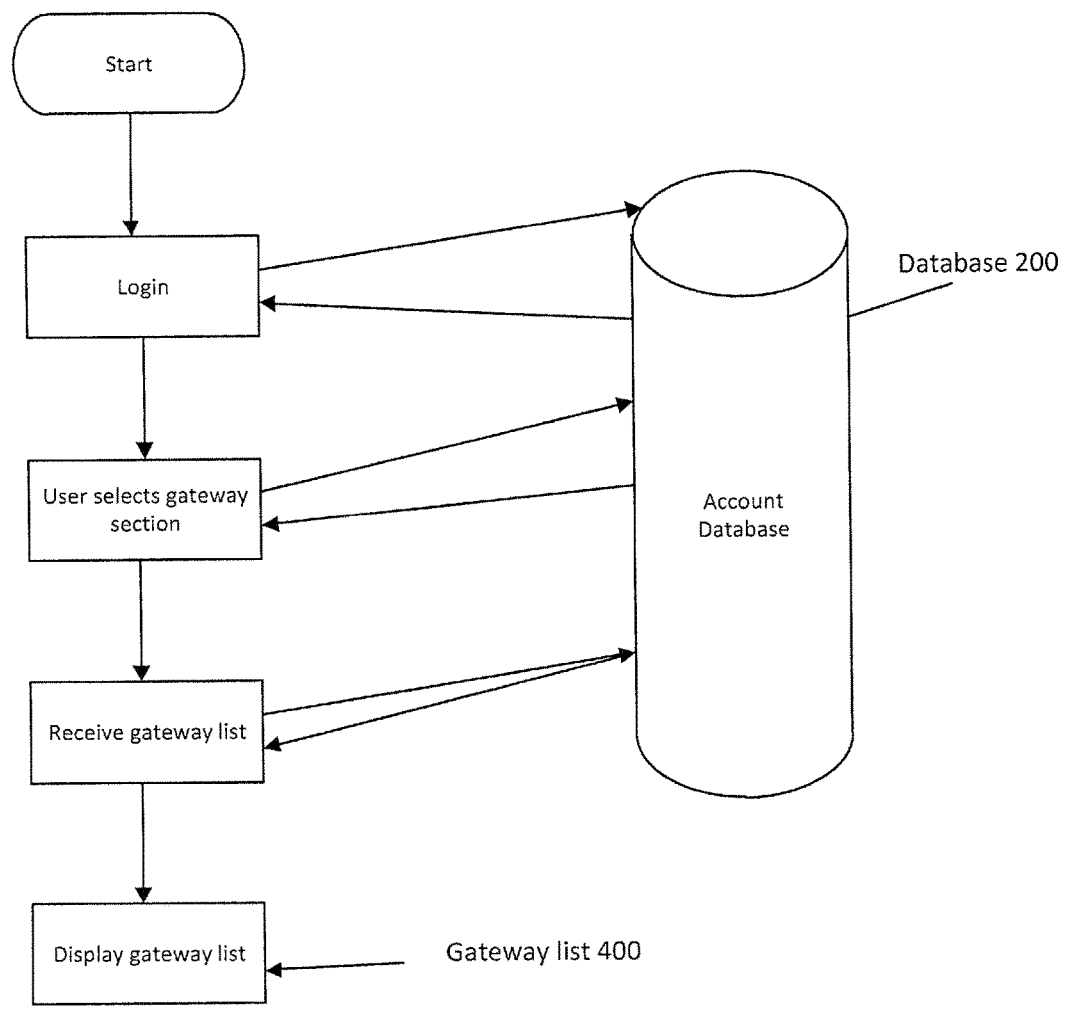
FIG. 2 illustrates a database configuration and function, according to an example.

FIG. 2 is an example description of the flow in which an application retrieves information from multiple gateways simultaneously in a seamless interface. This is made possible through the use of a consolidated database 200 with multiple collections. Each collection stores separate data that can then be referenced across each collection. By doing this, data can be complied from multiple gateways 120 and display that information as one list to the user interface 151. This gives the user a seamless experience and removes the need to access each gateway 120 directly or have the knowledge of which gateway 120 each device 130 is connected to in order to control or receive information from a specific device. Gateway list 400 can be displayed as individual gateway 120(s) or as a higher level view of entire gateway list in account and individual state.

Figure 3:
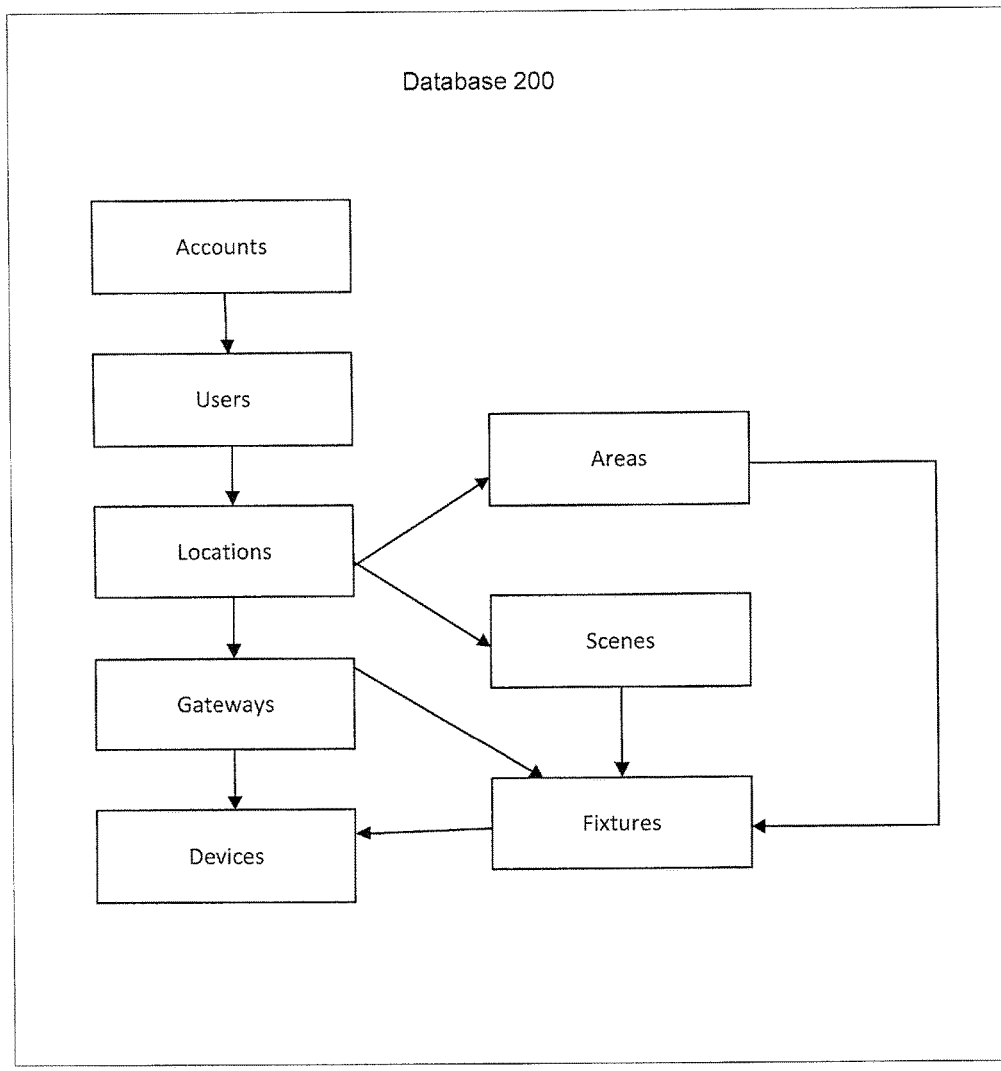
FIG. 3 illustrates a database, according to an example.

FIG. 3 describes the contents of an example database 200. Database 200 consists of multiple collections of data. These collections are defined as Accounts, Users, Locations, Gateways, Devices, Areas, Scenes and Fixtures. Accounts represent the highest level in the data hierarchy. All collections or data grouping fall under a specific account, which helps define access to overall data for an account. Users represent individual user accounts that are part of the overall account. Locations represent the physical sites that fall under an account. An account can have a limitless amount of locations associated with it. Gateways represent the physical Gateways 120 devices that fall under a specific location(s). Devices represent the Devices 130 that are connected to the Gateways 120 and fall under the gateways collection. Fixtures represent a collection of one or more devices and fall under gateways. Areas represent a collection of one or more fixtures and fall under locations. By doing so, an area is able to have fixtures from any gateway, without regard to physical connection. Scenes represent a collection of one or more fixtures and can store a specific set point and fall under locations. By doing so, a scene is able to have fixtures, with specific set points from any gateway, without regard to physical connection.

Figure 4:
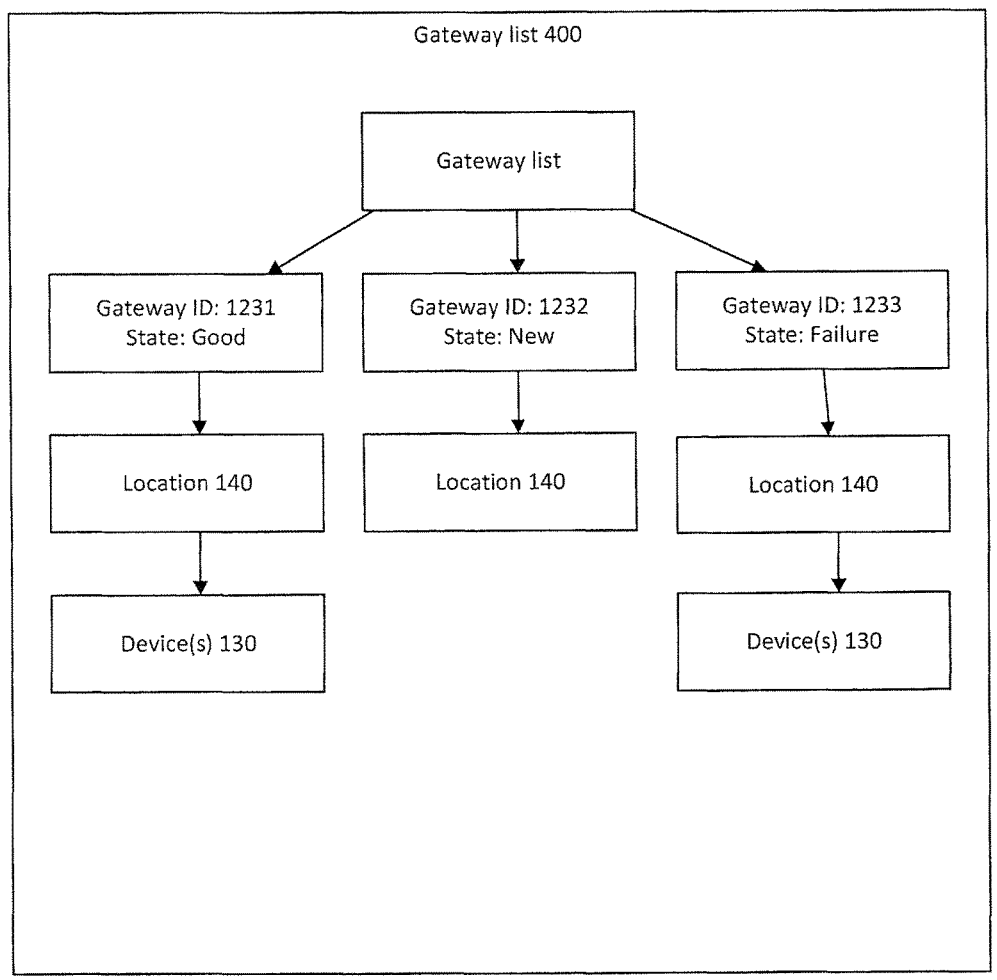
FIG. 4 illustrates a gateway configuration and function, according to an example.

FIG. 4 describes an example user interface in which Gateway list 400 displays all gateways 120 associated with an account. This collection details out the number of device 130(s) associated with each gateway, state of each gateway, ID of each gateway and location 140 each gateway. All gateway 130(s) must have a UDID (Unique Device ID) entered in order to be displayed and connect to an account.

In this example, Gateway 1231 is operating properly, and its location 140 and devices 130 may be visible to the user. Gateway 1232 may have just been installed or activated. Gateway 1233 may be indicated as not working properly. Configuration and other information may be re-downloaded to gateway 1233 in an attempt to get it working properly. Another gateway may also be swapped in the place of gateway 1233, and configuration information downloaded to it to rapidly swap gateways and reduce downtime of the system.

Figure 5:
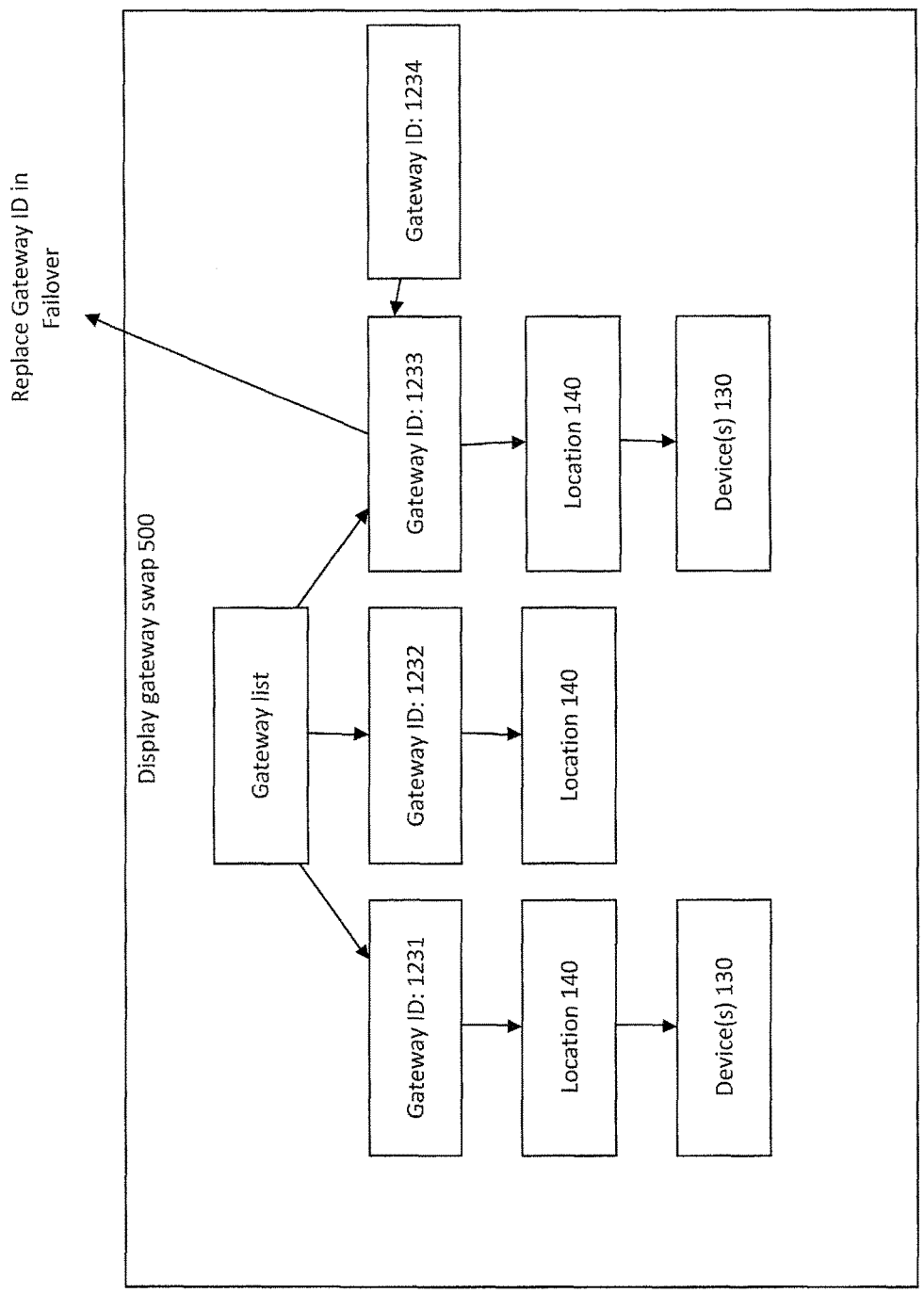
FIG. 5 illustrates a method and system in which a gateway is swapped, according to an example.

FIG. 5 describes an example method in which a gateway 130 is swapped without any data loss regarding location 140 and device(s) 130. This system is designed to allow a user/account owner to easily swap one gateway with another, either due to failure or otherwise, without the need to reprogram or commission any associated information. In this way, if for example a gateway 1233 were to fail, the user/account owner only need to replace the gateway 120 UDID with a new gateway 120 UDID and all associated information is automatically paired with the new gateway 1234.

Figure 6:
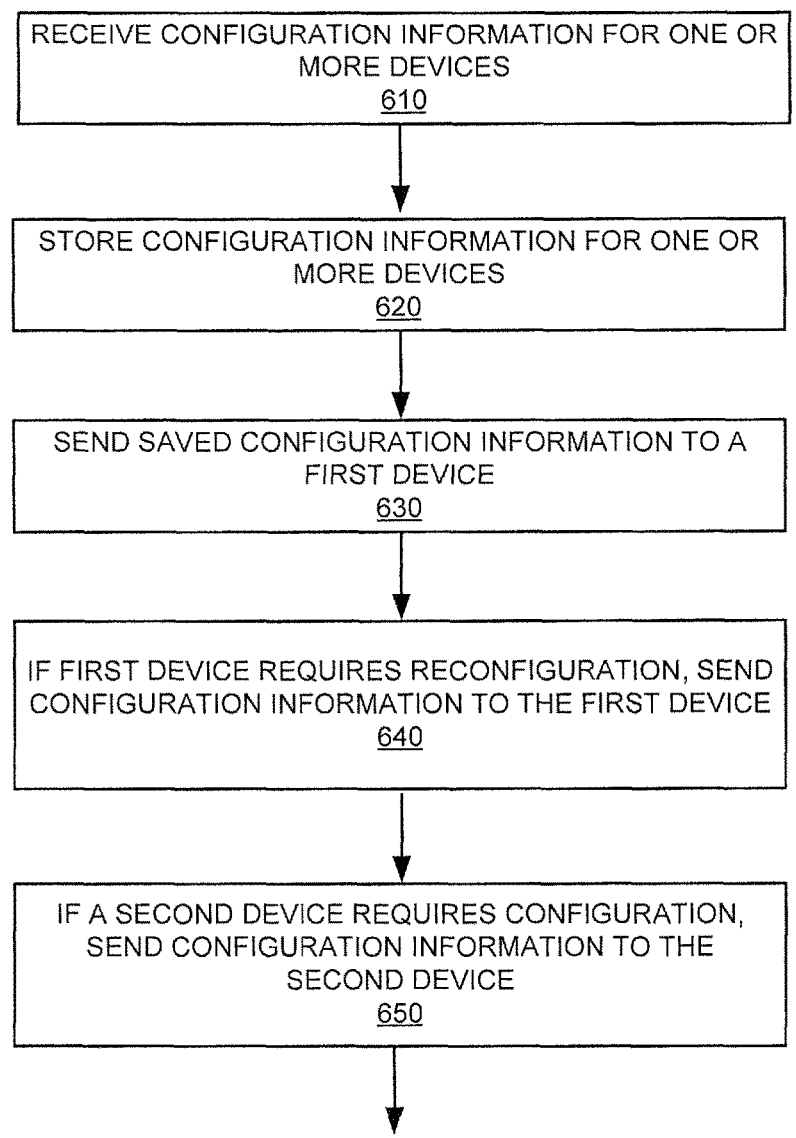
FIG. 6 illustrates method according to an example.

FIG. 6 is a method 600 of rapidly configuring one or more gateways or other hardware devices, according to an example. Method 600 includes receiving configuration information for one or more devices, or a user, or other source 610. Devices may be able to connect to a network and then to the Internet. The devices may include a gateway, or other hardware or software defined device. The device(s) may provide information about itself to the gateway after generally automatically connecting or identifying itself to the gateway or other device.

Method 600 also includes storing the configuration information 620, which may include configuration information for a device to a cloud based storage or other storage. A user may input this information, and/or the information may be predetermined and predefined. Some devices may be associated with a gateway.

The saved information may be sent to a first device. The information may be used in part to configure the device for use within the system 100. The information from the devices may be received by the device and used in part to configure the device.

If the first device requires reconfiguration or the first device did not configure properly, the saved information may be resent to configure the first device 640. If the first device fails or otherwise need to be replaced or redundancy is desired, the stored information may be sent to a second device 650. The second device may receive and use the information at least in part to configure itself for use in the system.

Although the example method is used for rapidly swapping gateways, it should be understood that the method could apply to any situation for configuring or reconfiguring one or more devices.

Additionally, it should be understood that the order of events in method 600 could be rearranged or accomplished concurrently by various different devices, etc.

Figure 7:
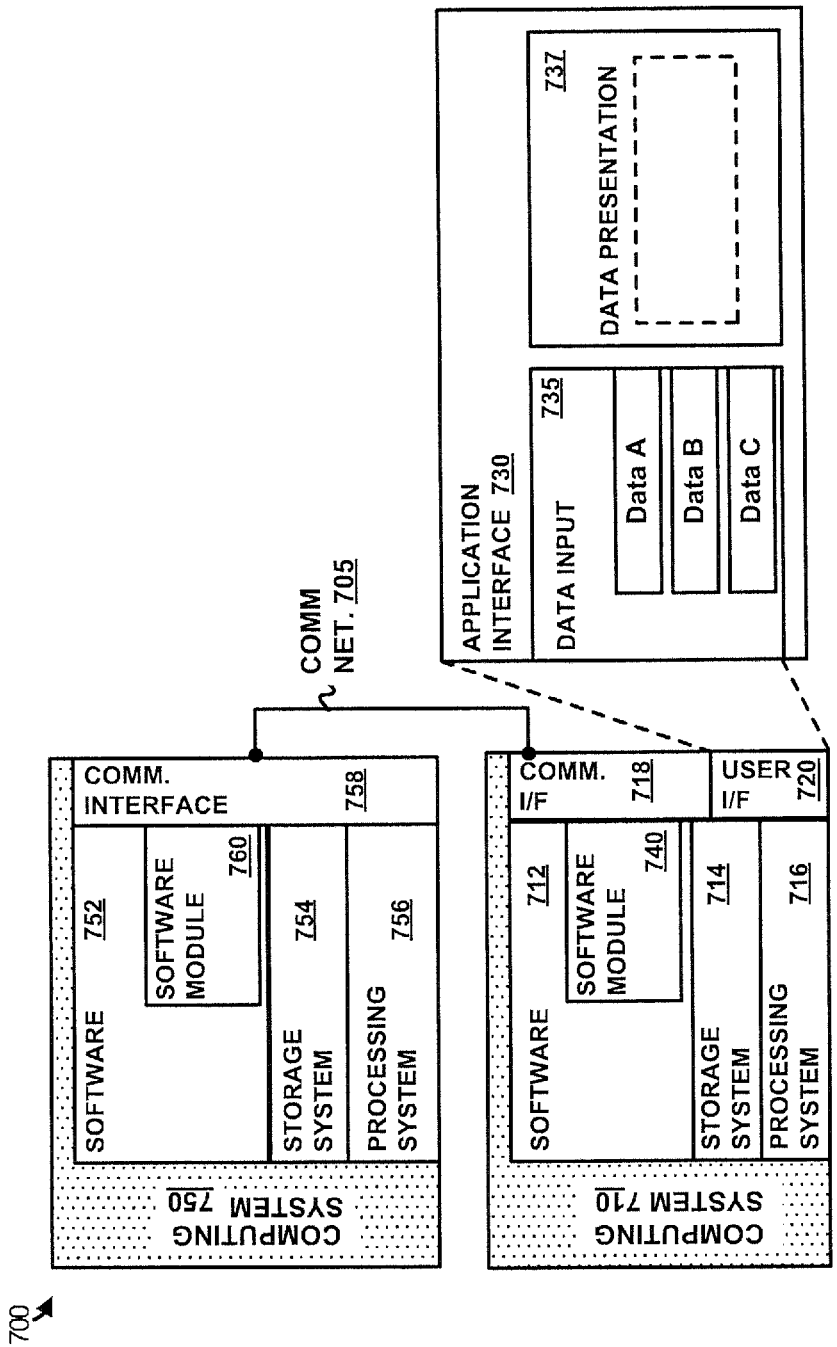
FIG. 7 illustrates a computing environment according to an example.

FIG. 7 illustrates a computing environment 700 according to one example. Computing environment 700 includes computing system 710 and computing system 750. Computing system 710, in the present example, corresponds to user device, and computing system 750 corresponds to cloud services 150. Computing system 710 can include any smart phone, tablet computer, laptop computer, or other computing or mobile device capable of reading, and/or recording data about systems, devices, locations, and/or equipment, etc. Computing system 750 can include any server computer, desktop computer, laptop computer, or other device capable of storing and managing the data received from computing system 710 and database 200, as well as modules for controlling devices, as described herein.

In FIG. 7, computing system 710 includes processing system 716, storage system 714, software 712, communication interface 718, and user interface 720. Processing system 716 loads and executes software 712 from storage system 714, including software module 740. When executed by computing system 710, software module 740 directs processing system 716 to receive configuration information, devices, locations, and/or equipment, etc. Such data could include any of the information described above, including but not limited to the functionality described for FIGS. 1-6.

Although computing system 710 includes at least one software module in the present example, it should be understood that one or more modules could provide the same operation. Similarly, the computing systems may be distributed using other computing systems and software.

Additionally, computing system 710 includes communication interface 718 that can be further configured to transmit the user inputs and data to computing system 750 using communication network 705. Communication network 705 could include the Internet, cellular network, satellite network, RF communication, blue-tooth type communication, near field, or any other form of communication network capable of facilitating communication between computing systems 710, 750. This includes systems described above for links 161 and 164.

Referring still to FIG. 7, processing system 716 can comprise a microprocessor and other circuitry that retrieves and executes software 712 from storage system 714. Processing system 716 can be implemented within a single processing device but can also be distributed across multiple processing devices or sub-systems that cooperate in executing program instructions. Examples of processing system 716 include general purpose central processing units, application specific processors, and logic devices, as well as any other type of processing device, combinations of processing devices, or variations thereof.

Storage system 714 can comprise any storage media readable by processing system 716, and capable of storing software 712. Storage system 714 can include volatile and nonvolatile, removable and non-removable media implemented in any method or technology for storage of information, such as computer readable instructions, data structures, program modules, or other data. Storage system 714 can be implemented as a single storage device but may also be implemented across multiple storage devices or subsystems. Storage system 714 can comprise additional elements, such as a controller, capable of communicating with processing system 716.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

Although one software module is shown, the software may be distributed across many devices, storage media, etc.

User interface 720 can include a mouse, a keyboard, a camera, image capture, a Barcode scanner, a QR scanner, a voice input device, a touch input device for receiving a gesture from a user, a motion input device for detecting non-touch gestures and other motions by a user, and other comparable input devices and associated processing elements capable of receiving user input from a user. These input devices can be used for defining and receiving data about the systems, devices, locations, and/or equipment, etc. Output devices such as a graphical display, speakers, printer, haptic devices, and other types of output devices may also be included in user interface 720. The aforementioned user input and output devices are well known in the art and need not be discussed at length here.

Application interface 730 can include data input 735 and data presentation 737. In one example, data input 735 can be used to collect information regarding configuration, devices, locations, etc. to be controlled.

Further, application interface 730 could include data presentation portion 737, which could be used to present information about configuration, systems, devices, locations, and/or equipment, etc. It should be understood that although computing system 710 is shown as one system, the system can comprise one or more systems to collect data.

In an example, computing system 750 includes processing system 756, storage system 754, software 752, and communication interface 758. Processing system 756 loads and executes software 752 from storage system 754, including software module 760. When executed by computing system 750, software module 760 directs processing system 710 to store and manage the data from computing system 710, devices, gateways, and other computing systems. The data can include information about configuration, devices, locations, etc., as well as one or more software module to control, configure, manipulate devices, etc.

Although computing system 750 is shown as including one software module in the present example, it should be understood that one or more modules could provide the same operation.

Additionally, computing system 750 includes communication interface 758 that can be configured to receive the data from computing system 710 using communication network 705.

Referring still to FIG. 7, processing system 756 can comprise a microprocessor and other circuitry that retrieves and executes software 752 from storage system 754. Processing system 756 can be implemented within a single processing device but can also be distributed across multiple processing devices or sub-systems that cooperate in executing program instructions. Examples of processing system 756 include general purpose central processing units, application specific processors, and logic devices, as well as any other type of processing device, combinations of processing devices, or variations thereof.

Storage system 754 can comprise any storage media readable by processing system 756, and capable of storing software 752 and data from computing system 710. Data from computing system 710 may be stored in a database or any other form of digital file. Storage system 754 can include volatile and nonvolatile, removable and non-removable media implemented in any method or technology for storage of information, such as computer readable instructions, data structures, program modules, or other data. Storage system 754 can be implemented as a single storage device but may also be implemented across multiple storage devices or sub-systems. Storage system 754 can comprise additional elements, such as a controller, capable of communicating with processing system 756.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

In some examples, computing system 750 could include a user interface The user interface can include a mouse, a keyboard, a voice input device, a touch input device for receiving a gesture from a user, a motion input device for detecting non-touch gestures and other motions by a user, and other comparable input devices and associated processing elements capable of receiving user input from a user. This configuration may eliminate the need to receive information from a user device.

Output devices such as a graphical display, speakers, printer, haptic devices, and other types of output devices may also be included in the user interface. The aforementioned user input and output devices are well known in the art and need not be discussed at length here.

It should be understood that although computing system 750 is shown as one system, the system can comprise one or more systems to store and manage received data.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for configuring devices using a cloud infrastructure, comprising;
   receiving configuration information for one or more devices to be controlled from a user or from the devices to be controlled at a computing device;
   storing the configuration information at a memory;
   sending the received or stored configuration information to a first device, wherein the configuration information is used at least in part to configure the first device;
   sending the received or stored configuration information to the first device if the first device requires reconfiguration; and
   sending the received or stored configuration information to a second device if the second device requires configuration,
   wherein first device or the second device comprises a communication gateway,
   wherein the device communicates to the communication gateway at least in part via 802.15 protocol, and the communication gateway communicates to the Internet at least in part via Ethernet protocol, and wherein one or more devices communicates device information to the first or second communication gateway, and the first or second communication gateway translates the device information into a communication format useable on the Internet.

2. The method of claim 1, wherein the computing device comprises cloud services.

3. The method of claim 1, further comprising sending the received or stored configuration information to the second device if the first device is not functioning properly.

4. The method of claim 1, further comprising swapping the first device and the second device.

5. The method of claim 1, wherein the received or stored configuration information comprises a unique device identifier.

6. The method of claim 1, wherein the one or more devices to be controlled comprise light bulbs, lighting drivers, wireless adapters, photo sensors, motion sensors, water/moisture sensors, switches, temperature sensors, fluid level sensors, thermostats, network sensors, power outlets, circuit breakers, utility meters, display devices, or appliances.

7. A non-transitory computer readable storage medium, having stored thereon instructions, which if executed by a processor, cause the processor to:
receive configuration information for one or more communication gateways to be controlled from a user or from the communication gateways to be controlled at a computing device;
store the configuration information at a memory;
send the received or stored configuration information to a first communication gateway, wherein the configuration information is used at least in part to configure the first communication gateway;
send the received or stored configuration information to the first communication gateway if the first communication gateway requires reconfiguration; and
send the received or stored configuration information to a second communication gateway the second communication gateway requires configuration; and
send the received or stored configuration information of the first communication gateway to the second communication gateway if the first communication gateway is not functioning properly,
wherein the computing device comprises cloud infrastructure,
wherein the computing device communicates to the communication gateways at least in part via 802.15 protocol, and the communication gateways communicate to the Internet at least in part via Ethernet protocol, and
wherein the computing device communicates device information to the first or second communication gateway, and the first or second communication gateway translates the device information into a communication format useable on the Internet.

8. The computer readable medium of claim 7, having further instructions, wherein the computing device comprises cloud services.

9. The computer readable medium of claim 7, having further instructions which cause the processor to swap the configuration information for the first communication gateway to the second communication gateway.

10. The computer readable medium of claim 7, having further instructions wherein the received or stored configuration information comprises a unique device identifier.

11. The computer readable medium of claim 7, wherein a device communicates to the first or second communication gateway at least in part via 802.15 protocol, and the communication gateway communicates to the Internet at least in part via Ethernet protocol.

12. A system for rapidly configuring a communication gateway, comprising:
a computing device capable of receiving configuration information for one or more communication gateways to be controlled from a user and from the one or more communication gateways to be controlled at a computing device; storing the configuration information at a memory; sending the received or stored configuration information to a first communication gateway, wherein the configuration information is used at least in part to configure the first communication gateway for use in a system; sending the received or stored configuration information to the first communication gateway if the first gateway requires reconfiguration; and sending the received or stored configuration information to a second communication gateway if the second gateway requires configuration,
wherein the computing device comprises cloud infrastructure,
wherein a device communicates to the first or second communication gateway at least in part via 802.15 protocol, and the communication gateways communicates to the Internet at least in part via Ethernet protocol, and
wherein the computing device communicates device information to the first or second communication gateway, and the first or second communication gateway translates the device information into a communication format useable on the Internet.

13. The system of claim 12, wherein the computing device is further configured to send the received or stored configuration information to the second communication device if the first communication device is not functioning properly.

14. The system of claim 12, wherein the received or stored configuration information comprises a unique device identifier.

15. The system of claim 12, wherein the one or more devices to be controlled comprise light bulbs, lighting drivers, wireless adapters, photo sensors, motion sensors, water/moisture sensors, switches, temperature sensors, fluid level sensors, thermostats, network sensors, power outlets, circuit breakers, utility meters, display devices, or appliances.

16. The system of claim 12, wherein the memory is generally remote from the first or second communication gateways.

* * * * *